United States Patent [19]

Shinler

[11] Patent Number: 4,977,824
[45] Date of Patent: Dec. 18, 1990

[54] ROLL-UP CAMPFIRE COOKING GRILL ASSEMBLY

[76] Inventor: LeRoy J. Shinler, Rte. 1, Box 220, Rush City, Minn. 55069

[21] Appl. No.: 519,633

[22] Filed: May 7, 1990

[51] Int. Cl.⁵ .................. A47J 33/00; A47J 37/07
[52] U.S. Cl. .................................. 99/449; 99/450; 126/9 B; 126/25 R
[58] Field of Search ............... 99/339, 340, 449, 450, 99/448, 421 R, 419; 126/9 B, 9 A, 9 R, 25 R, 25 A, 29, 30; 52/645; 211/181, 182, 175; 108/111-113

[56] References Cited

U.S. PATENT DOCUMENTS

| | | | |
|---|---|---|---|
| 718,714 | 1/1903 | Larson | 99/449 X |
| 1,473,056 | 11/1923 | Steen | 126/9 B |
| 3,537,388 | 11/1970 | Martin | 126/9 R |
| 3,785,360 | 1/1974 | Martin | 126/30 |
| 3,828,759 | 8/1974 | Cooper | 126/25 R |
| 4,120,279 | 10/1978 | White | 99/340 |
| 4,178,844 | 12/1979 | Ward et al. | 211/175 X |
| 4,191,160 | 3/1980 | Elliott | 126/9 R |
| 4,393,857 | 7/1983 | Sanford | 52/645 X |
| 4,589,399 | 5/1986 | Hamill et al. | 126/30 |
| 4,724,753 | 2/1988 | Neyman et al. | 99/339 |

Primary Examiner—Timothy F. Simone
Attorney, Agent, or Firm—Kinney & Lange

[57] ABSTRACT

A roll-up cooking grill assembly presents, when in an open condition for use, a relatively flat, substantially rectangular, upwardly facing cooking table; and, when in a rolled up condition for cleaning and for storage, is configured to fit inside of a cylindrical case. The rectangular cooking table is made up of a plurality of mutually parallel, spaced-apart, transversely extending rods. Each side plate of two sets of longitudinally extending overlapping side plates is permanently connected to the ends of two immediately adjacent rods. Each side plate has a leading end portion permanently mounted with respect to an outer end of a first of said rods, an intermediate portion permanently mounted with respect to an immediately adjacent second rod in trailing direction, and a trailing end finger portion extending into interfering relation above a third rod immediately adjacent the second rod in trailing direction. Each end of each rod is permanently mounted to two adjacent side plates. At least one of these first and second rods is rotatably mounted with respect to each side plate and the upper edge surfaces of the rods define a relatively flat cooking table surface in open condition when the trailing end fingers of each side plate are supported on the upper edges of each third trailing rod.

18 Claims, 4 Drawing Sheets

ROLL-UP CAMPFIRE COOKING GRILL ASSEMBLY

BACKGROUND OF THE INVENTION

This invention has relation to portable campfire cooking grills of the type in which a plurality of parallel, spaced-apart rods are positioned over a ground-supported campfire or bed of charcoal to broil, boil, fry or otherwise prepare food in an "away-from home" situation; and in the situation where such cooking grills must be carried to and from the cooking site whether cleaned or uncleaned, stowed in vehicles and/or backpacked for transport to or from the camp site/-cooking site, and stored at the "home base" between uses.

Cooking grills of the prior art include parallel spaced-apart rods mounted in rigid rectangular frames which can be supported, for example, at opposite ends by top edges of indigenous rocks built up at semi-permanent campsites by previous campers. Typical of this usage are the fireplaces provided at portages on the canoe trails of the wilderness canoe areas of our northern states and maintained by the U.S. Forest Service. In these situations, no legs directly attached to the cooking grills are needed.

Other similar rectangular cooking grills do include legs. These legs can consist, typically, of spike-like rods formed with top loops so that they literally dangle from each of the four corners of the cooking grill, and can be pushed down into sandy soil or other soft ground where rock or major tree roots can be avoided to support the cooking grill in a horizontal plane and at a proper height above a charcoal fire in a pan or a trench-type cooking fire.

In each of these situations, and in the case of other cooking grills having either rectangular or circular fixed support rims to which parallel spaced-apart rods are fixed, after the grills have been used for their intended purposes, the parallel rods forming the cooking table can be covered with burned on grease (splatter from a fry pan), meat and vegetable particles (broiling meat and kabobs and roasting corn), and just plain old soot from the cooking fire itself (from boiling and heating water) and from broiling, roasting and frying meats and vegetables. The problem of cleaning such solid, flat cooking grill tables and/or packing them out either cleaned or dirty, storing them at home until "next time" either cleaned or dirty, and then again packing them in to a campsite is a difficult one at best and is a frustrating one to say the least.

Such cleaning problems are aggravated because of the tendency to leave the cooking grill in place after it has served its purpose and while the cooked food is being eaten. In this situation, as the fire under the grill "dies down", the suet, fat, grease, and food particles are firmly baked on, just as enamel is baked on to other metal products at the factory.

Even after the cooking fire has gone out, been removed, or the rigid grill table has been removed from the fire and allowed to cool, the grill table must either then be cleaned or somehow covered or packaged so that it can be carried out without its soot and other unwanted substances being transmitted to other people, clothing or things with which it comes into contact. This means that it must either be cleaned at the camp site or covered in some kind of a canvas bag or the like for transport and/or storage. In the latter case, it must then either be cleaned upon reaching "home base" or it must be used "dirty" or cleaned and used "next time".

Cleaning at a camp site where all of the water has had to be brought in, presents the problem of use of a limited amount of used dish water, rinse water, or cold or specially heated water on a cooking grill which, by definition, must be larger in area than the pots it supports to heat such water. This means that any water with detergent which is used in a dishcloth or even on indigenous grasses can be used only one time and then lost as it soaks into the grasses and soaks into the ground beneath the grill. In campsites by lakes, rivers and streams, the use of sod cut from the campsite to scrub the cooking grills right down in the body of water itself is now no longer proper or even advisable because of the pollution which thousands upon thousands of such similar usages has caused to our endangered seashores, lakes, rivers and streams.

Use of the cooking grill assembly of the present invention will obviate or substantially lessen such problems.

SUMMARY OF THE INVENTION

A roll-up portable table assembly presents, when in open condition for use, a relatively flat, substantially rectangular, longitudinally extending upwardly facing table. When in rolled up condition for storage, the table assembly is configured to be circumscribed within a generally cylindrical surface.

The table assembly includes a plurality of mutually parallel, spaced-apart, transversely extending rods fastened between two sets of side plates. Each set of side plates includes a multiplicity of longitudinally extending side plates, each side plate itself having a leading edge portion permanently mounted with respect to an outer end of a first of the rods, an intermediate portion permanently mounted with respect to an immediately adjacent second rod in trailing direction, and a trailing end portion extending into interfering relation with, and situated above, a third rod immediately adjacent the second rod in trailing direction.

Each end of each rod is permanently mounted to two adjacent side plates; and at least one of these rods permanently mounted to each side plate is rotatably mounted with respect to the side plate.

In an open condition of the portable table assembly, the trailing end portion of each side plate will be supported on the upper edge of its third rod, and in this condition, the upper edge surfaces of all of the rods define a relatively flat surface of a table.

The table in the generic form of the invention, and in an open condition as summarized above, is rigid and can support food to be cooked, tablecloths and table settings, desk-type calendar pad protectors, trail maps, etc.

In the generic form of the invention, the table assembly in rolled up condition can be stored within a cylindrical space which has a diameter of not more than one-half of the longitudinal dimension of the length of the side plate sets when measured in open condition.

In the forms of the invention as shown, the side plates can be flat in configuration, angled rearwardly and slightly diagonally inwardly each from its leading end portion to its trailing end portion.

As shown, legs can be pivotally mounted to each corner of the rectangular table and can be pivoted so as to assume a position in substantially parallel alignment to the axes of the transversely extending rods. When so positioned the four legs can be rolled up with the table to not appreciably increase the diameter of the cylindrical surface needed to circumscribe the entire portable table assembly in rolled up condition.

In a first preferred embodiment of the invention, the four table legs have been shown to be generally L-shape in transverse cross-section and to taper from a point adjacent the pivot axis to the outer end of the leg. Each leg, when the grill table is in open condition, extends slightly divergingly outwardly from under the corner of the table, and lies in a vertical plane which extends at substantially a 45° angle with respect to the transverse axis of the rods and with respect to the longitudinal axis of the side plates.

Also disclosed and claimed is a cooking grill cooking, cleaning and storage kit which includes the generic table assembly specifically related to a cooking grill table plus a liquid-tight case in the form of a right circular cylinder having a closed bottom end and a removable cover means which is used to close a cavity within the case with a liquid-tight and moisture-tight seal. This case is defined as having an interior diameter of no less than one-third and no more than one-half of the longitudinal dimension of one of the sets of longitudinally extending side plates. The internal longitudinal dimension of the cylindrical case itself, with the removable cover means in place, is specified as being no less than the predetermined transverse dimension of the open cooking table measured along the axis of one of the cooking rods. In a preferred form, the interior cavity of the case and cover means is specified to be only slightly greater than the transverse dimension of the open grill table. A dimension of one inch or three centimeters more than the transverse dimension of the open grill table would not be more than slightly greater than that dimension. This allows room for some movement of the rolled up grill inside of the case, so that after cleaning liquid including perhaps detergent is placed into the case with the grill, there is room for considerable "sloshing" action of the cleaning liquid in and around all of the parts of the grill without that action being substantially inhibited by the side plates, the now even more closely positioned parallel rods, or the folded in legs.

In a second preferred embodiment of the invention, each of the transverse rods includes an elongate, relatively flat slat with a pair of mutually concentrically positioned stub shafts, each extending outwardly from an opposite end of the slat, these stub shafts extending into contact with the side plates. In each such table assembly, all of the stub shafts of all of the rods are fixedly mounted with respect to either an intermediate portion of the side plate or are all mounted fixedly with respect to a leading end portion of a slide plate. In either of these variant forms of the second embodiment, the slats are fixedly positioned with respect to the slide plates such that when the portable table assembly is in its open condition with the trailing end portion of each side plate supported on the upper edge of its third rod, the upper edge surfaces of the slats define the flat surface of the table.

DETAILED DESCRIPTION OF THE PREFERRED EMBODIMENTS

A roll-up cooking grill and portable table assembly 12 includes a plurality of mutually parallel, spaced-apart, transversely extending rods 14 and two sets 16,16 of longitudinally extending side plates 18. Each of the rods 14 is permanently mounted at its opposite ends with respect to two of the side plates 18 of each set 16; and each side plate 18 is permanently mounted to two immediately adjacent rods 14.

Additionally, in the forms of the invention as shown, four cooking grill and table assembly legs 20 are provided, each being pivotally mounted to one of the four corners of a portable table 22 which is formed by the two sets 16 of side plates 18 and the transversely extending rods 14.

Figure 3:
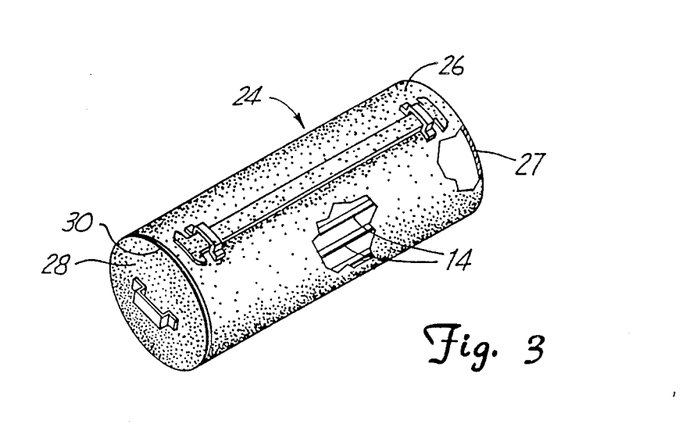
FIG. 3 is a perspective view at reduced scale of a cylindrical case and cover means forming part of a cooking grill storage, cleaning and cooking kit forming a part of the present invention.
Figure 4:
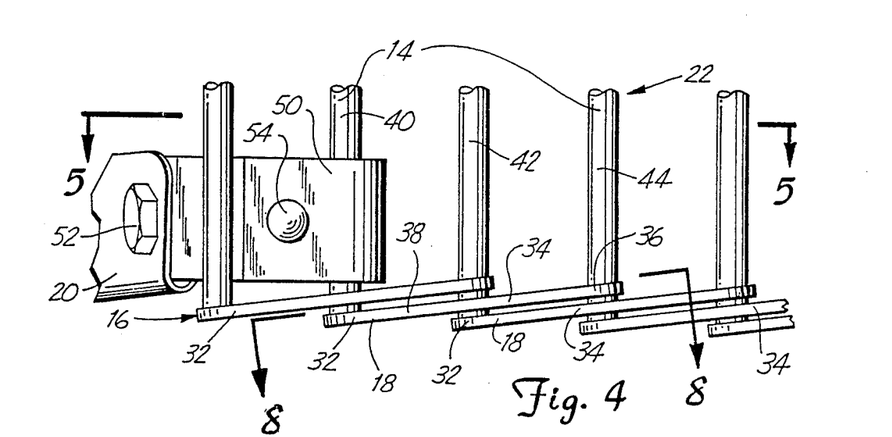
FIG. 4 is a fragmentary, enlarged top plan view of the front corner portion of the cooking grill of FIG. 1.

A cooking grill storage, cleaning and cooking kit 24, according to a first preferred embodiment of the present invention includes all of the elements set out above plus a liquid-tight right circular cylindrical case 26 having a closed bottom end 27 and a cover means or cover 28 which can be removably sealed to an open end 30 of the case 26. The cover 28 can be screwed into the open end 30 of the case 26 or removably fastened to it in any usual or preferred manner so long as the seal between the case and the cover is liquid-tight when the rolled up cooking grill and portable table assembly 12 is inside of the case for cleaning or transport and is moisture-tight when the cooking grill assembly 12 and the interior of the case 26 are dry and the assembly 12 is inside the case 26 for storage.

A major object of the invention is to provide a portable table which can serve as a cooking grill table or as a table for other purposes and which table will maintain a firm horizontal, plane surface when in its open condition, but which can be inverted and rolled up to take relatively little space and can be easily cleaned and stored in such a rolled-up condition.

To achieve the object of horizontal stability or rigidity of portable table 22, each of the longitudinally extending side plates 18 of the two spaced-apart parallel side plate sets 16,16 are permanently connected at each end to two of the transversely extending rods 14. As seen in FIGS. 4, 5, 6 and 8, one of the rods 14 is permanently mounted with respect to a leading end portion 32 of each of the side plates 18, a second rod 14 is pivotally mounted around an intermediate portion 34 of each side plate 18, and yet another or third rod 14 is situated to be in interfering relation with a trailing end portion 36 of each side plate 18. As seen in FIGS. 5, 6, 8 and 9, each trailing end portion 36 is in the form of a trailing finger situated above one of the transversely extending rods 14.

Thus, each side plate 18 is related differently to each of three immediately adjacent rods. For clarity of explanation and for identification in the claims, each of the three rods 14 pictured in FIGS. 8, 9 and 10 will be given numbers associated with typical but illustrative side plates 38 and 39.

Figures 5, 6:
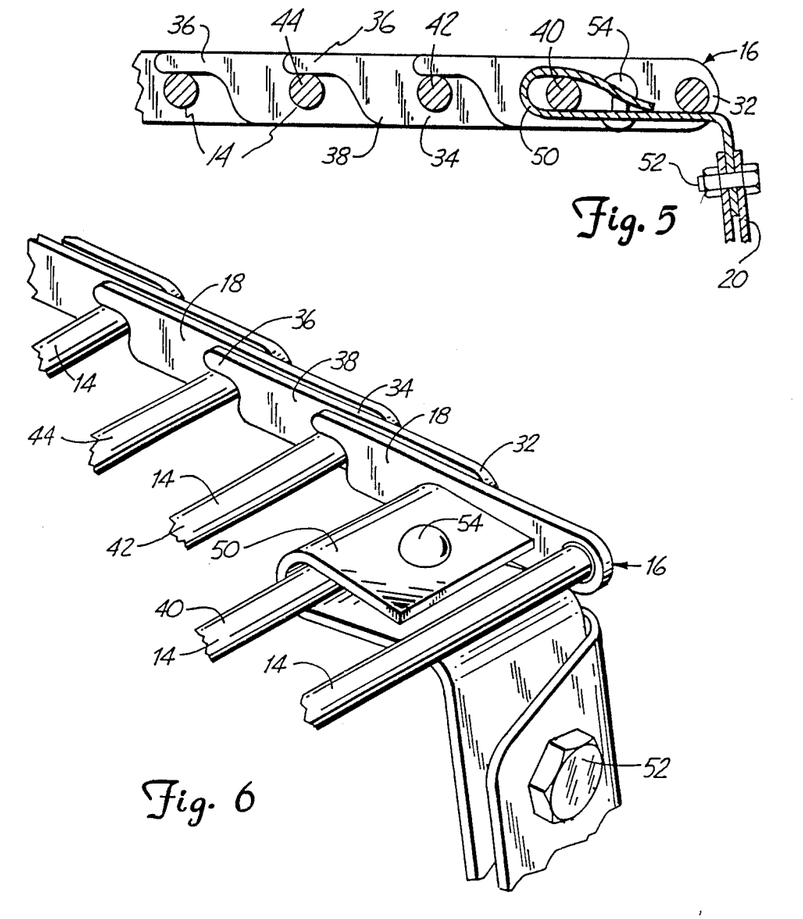
FIG. 5 is a vertical sectional view taken on the line 5—5 in FIG. 4.
FIG. 6 is a fragmentary perspective view of the structure seen in FIGS. 4 and 5.
Figure 7:
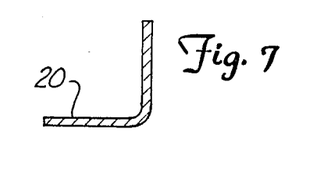
FIG. 7 is a horizontal sectional view taken on the lines 7—7 in FIG. 1.
Figure 8:
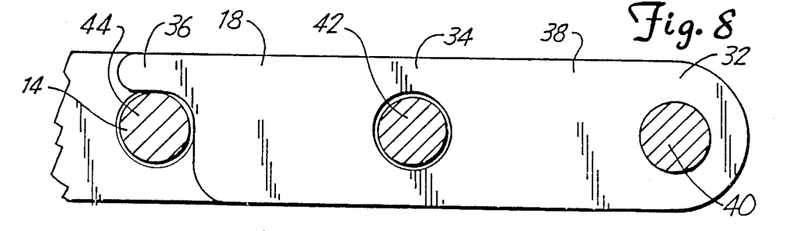
FIG. 8 is an enlarged vertical sectional view taken on the line 8—8 in FIG. 4 showing a first transverse rod fixedly mounted to a leading end portion of a side plate and a second transverse rod pivotally mounted with respect to that side plate in one variation of the invention.

In FIGS. 5, 6 and 8, and as most clearly seen in FIG. 8, with respect to the illustrative side plate 38, a first rod 40 is permanently and fixedly mounted to the leading end portion 32 of side plate 38, a second rod 42 is permanently and pivotally mounted through the intermediate portion 34 of the side plate 38, and a third rod 44 lies in interfering relation under the trailing end portion or finger 36 of the side plate 38.

Each of the rods 14 will have a different relationship to each of the three side plates it contacts. For example, in FIG. 8 the third rod 44 with respect to side plate 38 will be the second rod 42 with respect to its adjacent trailing side plate, and will be the first rod 40 with respect to the next trailing side plate in the set 16.

FIGS. 1, 4, 5, 6, and 8 all illustrate portions of the roll-up cooking grill and table assembly in an open condition. As clearly seen in FIGS. 5, 6 and 8, with the parts in this position such that each trailing end portion or finger 36 of each side plate is resting on the top edge surface of one of the rods 14, as long as the rod permanently mounted to the leading end portion of the first leading side plate 18 and the rod in contact with the last trailing end portion or finger 36 are supported in the same horizontal plane, the entire table defined by the upper edge portions of all of the rods will be stable and useful in supporting pots and pans for boiling and frying and meat and vegetables for broiling and roasting.

Where permanent or relatively permanent fireplaces are present, or where other supports for the rod 14 at the leading end of the lead side plate and rod 14 in interfering relation with the trailing end portion of the last full side plate are provided, the cooking grill table assembly while resting on such supports, will function in accordance with its intended purpose.

Figure 2:
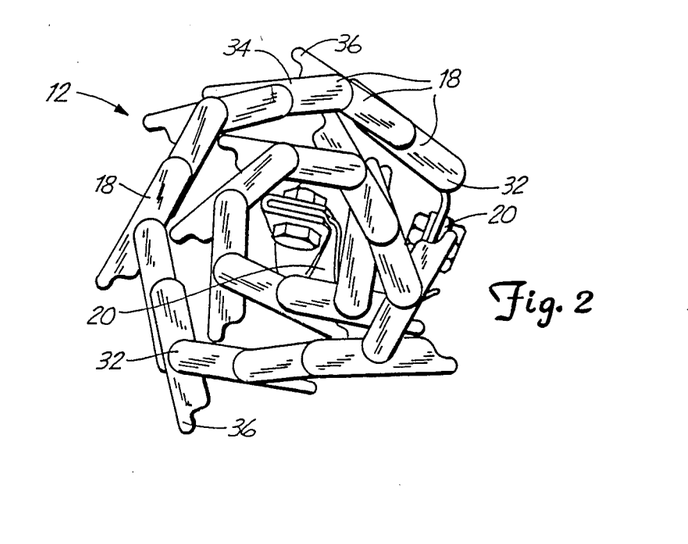
FIG. 2 is an enlarged edge view of the cooking grill and portable table assembly of claim 1 shown in a rolled up condition to facilitate cleaning and storage.

When the cooking grill or other table assembly has served its purpose in cooking, as a kitchen work table or as a table for any purpose, it can be rolled up by inverting it and rolling the mutually parallel transversely extending rods from either the lead end including the first or lead rod mounted in the leading end portion of the lead side plate or from the trailing end including the third rod in contact with the next to the last pair of side plates. (The last pair of side plates is truncated to eliminate the unnecessary trailing end portion or finger 36.) FIG. 2 illustrates the appearance of the cooking grill and portable table assembly 12 when in its rolled up condition, the roll having been started from the last rod permanently mounted in the truncated trailing pair of side plates.

In many situations, it is advantageous to have two or more of the four legs 20 available to support the portable table 22 in its open condition. For example, where permanent brick or rock fireplaces are available, one end of the grill table may advantageously be supported on one side of the permanent fireplace brick or rock structure, and the other end may not reach to the other side of the permanent fireplace. In that situation, two of the legs 20 at the leading end or trailing end of the table 22 can be set on the ground or sunk slightly into the ground to support the table in a level position suitable for frying eggs in a pan, for example. In this situation, support of the transverse rod at one point near the midsection of the rod at the end opposite the downwardly extending legs will provide a satisfactory and stable positioning for the cooking grill in its open condition.

As seen in FIGS. 5 and 6, legs 20 are very similar in shape to well known aluminum tent pegs except that the very top portion of the legs are crimped down on leg hinge straps 50 and are pivotally mounted to the hinge straps through the instrumentality of nuts and bolts 52. The leg hinge straps 50 each extend around one of the second rods 14 of the leading or trailing side plate pair 18, and are riveted in place as at 54.

Figure 1:
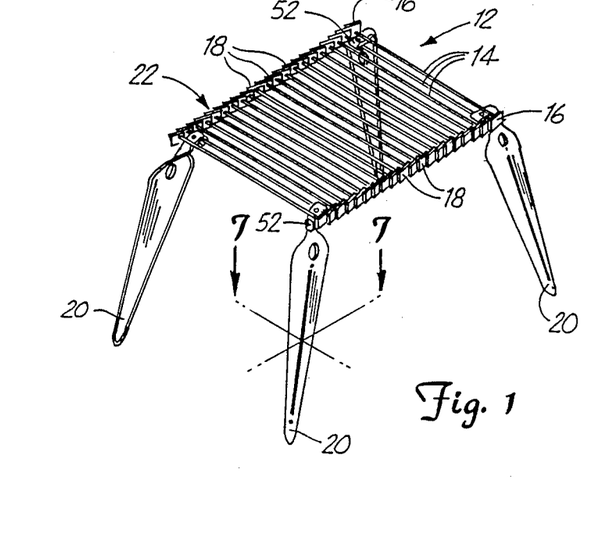
FIG. 1 is a perspective view of a roll-up cooking grill and portable table assembly of the present invention in an open condition ready for use in a first preferred embodiment.

When four such legs 20 are provided, to move the cooking grill from open condition of FIG. 1 to the rolled up condition of FIG. 2, all four of the legs 20 are pivoted on bolts 52 about the leg hinge straps 50 to bring the longitudinal axes of the legs into substantially parallel relationship to the longitudinal axes of the rods 14. Then the legs can be rolled right up with the rods and will have position as seen in FIG. 2.

When any leg or legs are not needed to afford a stable position for the portable table 22 in open condition, that leg or legs can be left folded up in parallel relationship with respect to the rods 14.

As clearly seen in FIG. 1, when in open condition, the legs extend substantially diagonally outwardly from each corner of the grill table. This is advantageous when using the legs to support the table 22 at a beach, for example, where loose sand is present, or anywhere that one or more of the legs need to be forced slightly into the ground to afford a level positioning of the grill table. The grill table can be leveled by this forcing of one or more of the legs into the ground with a pan such as a frying pan containing a small amount of water resting on top of the grill table. When the water is exactly level in the pan, the grill table will be precisely level. At that point, the diagonally outward angle of all four legs will tend to prevent further movement of the grill into the ground and perhaps out of level because the entire inward diagonally facing surface of each of the legs will resist movement into the ground even though movement of each leg into the ground in direct line with its longitudinal axis may be very easy to achieve.

After a cooking grill has been used, it is usually contaminated with all manner of grease, and meat and vegetable particles and is substantially always covered at least in part with soot from the cooking fire. Storing the old-fashioned fixed grill has always been a problem because it is large and flat and either rectangular or circular and it is difficult to wrap up and carry or stow in a vehicle both because of awkward size and because it is not always convenient, advisable or even possible to adequately clean such old-fashioned grills at the site where they are used. In the case of your present inventor, his family is accustomed to taking extended daytime trips along snowmobile trails into isolated forest areas such as maintained by the U.S. Forest Service, for example. Use of a charcoal fire and a cooking grill on such trips for preparing a hot noontime meal was and is a great feature of those trips if not an actual necessity. The plain fact is there is no place on a snowmobile to conveniently and/or safely store an old-fashioned fixed dimension cooking grill. This furnished the incentive for the creation of the cooking grill and work table assembly of the present invention. Since scrubbing off soot, baked on grease, meat and vegetable particles is a major project under freezing conditions, the cooking grill of the invention can be put into its rolled up condition, and deposited without cleaning into a canvas sack or bag of the proper dimensions, the drawstring on such a bag pulled shut, and the cooking grill stored conveniently in a restricted space for its return journey to "home base" where it can be conveniently cleaned in a kitchen sink, for example, while still in its rolled up condition or in a modified rolled up condition with the rods 14 standing vertically in the sink so that cleaning can be done on each rod if necessary without contaminating the rest of the kitchen sink area as would be necessary when cleaning an old-fashioned fixed dimension grill.

The prototype of this invention, which is illustrated herein, was, for example, 14" long in longitudinal dimension measured from the leading ends of the first pair of side plates to the trailing ends of the last pair of side plates, and was 12" wide in transverse dimension measured along the axis of one of the transversely extending rods 14 from outside of the first set of side plates 16 to the outside of the second set.

Legs 20 were of length to support the top table surface defined by the top edges of the rods 14 at approximately 10½ off of a level surface when the cooking grill assembly was in open condition. Using this prototype, it has been found that, when in rolled up condition for storage, the cooking grill assembly 12 is so configured as to be conveniently circumscribed by a cylindrical surface having a diameter of one-third of the longitudinal dimension of the cooking grill assembly in an open condition. Therefore, a canvas sack large enough to comfortably receive a cylinder of 4.7" in diameter and 12" long is sufficient to store the prototype grill and to transport it to and from its location for use.

An even more convenient structure for storage of the cooking grill assembly 12 in rolled up condition also provides, at the same time, a means for easy cleaning of the grill immediately after use and before the dirt is baked on. This is the liquid-tight, right circular cylindrical case 26 having a closed bottom end 27 and an open top end 30, together with removable cover means or cover 28 which can be sealed to the case in any usual or preferred manner, forming no part of the present invention per se. When stored and transported within sealed and closed case 28, the chance of damage to the cooking grill is eliminated, as is the possibility that the grill assembly itself can snag, scratch or otherwise damage materials and structures near which it is stored or carried.

At least equally important, when so encased, the cooking grill assembly 12 can be cleaned by simply adding water or other cleaning liquid and detergent to the case 26 before sealing the case with the cover 28. The sooner the grill can be cleaned after use, the easier the cleaning will be.

As soon as cooking is completed using the grill, two diagonally opposite legs 20 of the cooking grill in open condition can be grasped by one person or two persons and the grill lifted off of the cooking fire. The grill can be deposited "upside down" on the ground and will quickly be cooled by this ground contact. Legs 20 will all be folded into parallel relation to the axes of rods 14, the grill table will be rolled into rolled up condition and deposited within the case 26. Cleaning liquid such as water and detergent will be added to the case in appropriate quantity. Where abundant water is available, as much as three-quarters of the case can be filled with it. Where cleaning liquid is in short supply, as little as one-quarter or even less of the case can be filled with cleaning liquid and the cleaning can still be effective.

With cleaning liquid in place, the cover 28 will be sealed to the case, and the case agitated to cause the liquid to be more or less violently "sloshed" around every surface, cranny and crevice of the grill assembly. In order to tend to maximize the violent water action and to minimize the blocking action of the rolled up grill itself, the longitudinal dimension of the inside cavity formed by the case and the cover can be slightly longer than the transverse dimension of the grill measured along the axes of the rods 14. In the prototype illustrated and described, such an interior longitudinal dimension of 15" can be considered slightly longer than that of the rolled up grill.

By positioning the case horizontally with the grill and liquid therein during the journey home, the cleaning action will be continued. This action can be enhanced by occasionally rotating the case slightly from time to time on its longitudinal axis.

Whether the cover is removed, liquid poured out, and the grill, case and cover rinsed off "at home" or at the campsite, the next step in the use of the storage, cleaning and cooking kit is to thoroughly dry the interior surfaces of the case and cover and also to thoroughly dry the cooking grill assembly. If available, the sun can do the drying at the campsite and the grill can be put in open condition to speed the process. Once such dryness has been achieved either at home or at the campsite, the grill, again in rolled up condition, can be placed back in the case and the case and cover sealed to each other so that no moisture can enter. The kit can then be stored in the musty old basement, on the rafters under the leaky garage roof, or elsewhere with the assurance that it need not be opened again until it arrives at its next campsite for use. No rusting, corrosion or bacterial growth can have taken place.

As seen in FIGS. 5, 6 and 8, the first rod 40 of side plate 38 is fixedly mounted to that plate to prevent rotational movement of first rod 40 with respect to side plate 38. In this form of the invention, every first rod 14 is fixedly mounted to the leading end portion 32 of its side plate 18. Each second rod 14 (including second rod 42) is rotatably mounted through an intermediate portion 34 of its side plate (including side plate 38). This is an effective way to construct a cooking grill portable table of the invention; but the grill table would operate in substantially the same manner if both the first and second rods 14 of every side plate 18 were permanently rotatably mounted with respect to both of their side plates at each of their ends.

Figures 9, 10:
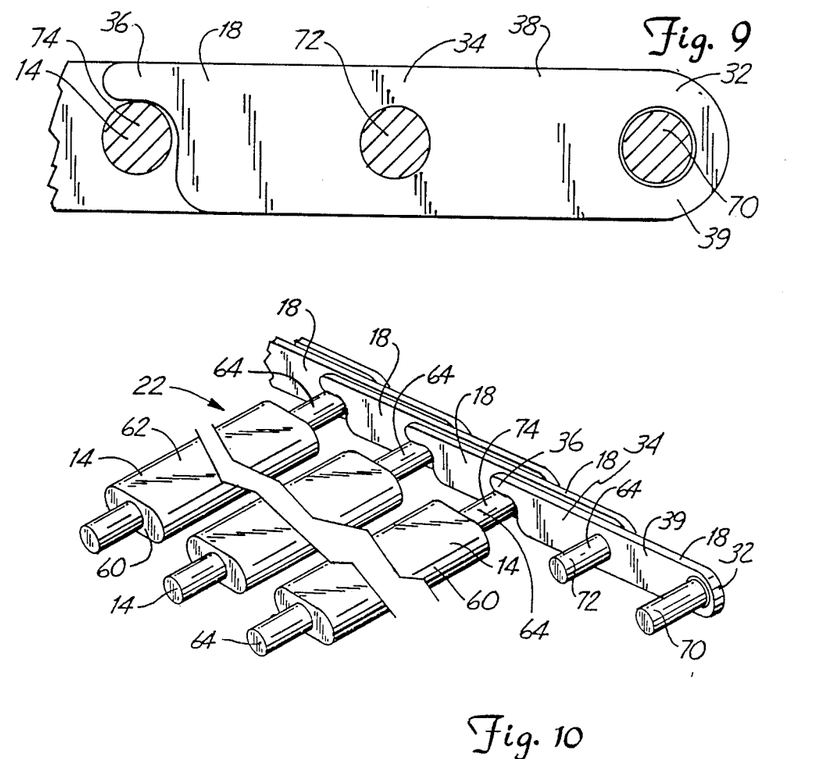
FIG. 9 is also a vertical sectional view taken on the line 8—8 in FIG. 4 but showing a first transverse rod pivotally mounted with respect to a side plate and a second transverse rod fixedly mounted with respect to that side plate in another variation of the invention.
FIG. 10 shows a modified form of transverse rod in accordance with a second preferred embodiment of the invention, this modified form of rod being usable with either the structure of FIG. 8 or the structure of FIG. 9.

Further, the same action can be obtained when, as seen in FIG. 9, the first rod 40 of the side plate 38 and each first rod 14 of every side plate 18 is rotatably mounted through a leading end portion 32 of its side plate; and the second rod 42 of side plate 38 and each second rod 14 of every side plate 18 is fixedly mounted to an intermediate portion 34 of its side plate. This construction will facilitate assembly and buildup of the components of the grill table as the leading end portions of each pair of following side plates can be temporarily sprung outwardly and the pivot openings in those leading end portions aligned with outer ends of the second rod of the side plate ahead of it, and then allowed to spring back toward each other so that the pivot openings in the leading end portions 32 of these two plates encompass the ends of this second fixedly mounted rod of the preceding side plate to become the first rod of the following side plate and to be pivotally mounted with respect to this following side plate.

Parts of a second preferred embodiment of the invention are illustrated in FIGS. 9 and 10. As partially illustrated in FIG. 10, each of the transversely extending rods 14 includes a slat 60 having a substantially flat upper surface 62. Each rod 14 also includes a pair of stub shafts 64,64, one extending outwardly from each end of the slat 60. The stub shafts 64,64 of each rod 14 are in concentric relation to each other and can have the same diameter as the entire rods 14 which are shown and described in connection with the earlier forms of the invention. Each stub shaft 64 is related to one of the side plates 18 in the manner shown in FIG. 9. Side plate 39 is the typical but illustrative side plate in FIGS. 9 and 10. A first typical stub shaft 64 is related to illustrative side plate 39 as part of a first rod 70 permanently and pivotally mounted through a leading end portion 32 of side plate 39. A second stub shaft 64 is related to side plate 39 as part of a second rod 72 which is permanently and fixedly mounted in an intermediate portion 34 of side plate 39. A third stub shaft 64 is related to side plate 39 as part of a third rod 74 which is fixedly mounted in the side plate 18 immediately following side plate 39, is pivotally mounted in the next following side plate 18, and serves as the third rod 74 of the side plate 39. Each of the stub shafts is fixedly mounted with respect to an intermediate portion 34 of one of the side plates, and the relationship between each side plate and each rod 14 is such that when the table assembly 12 is in its open position, the slat of each rod 14 will be situated as seen in FIG. 10 with its substantially flat upper surface 62, together with all of the surfaces 62 of all of the slats 60 of the rods 14 forming a flat surface of a portable table 22.

This embodiment of the invention operates similarly to the first preferred embodiment, and when the portable table is turned "upside down", and the legs (not shown) are folded in as described in connection with earlier forms of the invention, and the transversely extending rods and longitudinally extending side plates can be rolled up in the same manner as previously described.

While the first rod 70 is shown to be permanently rotatably mounted with respect to the leading end portion 32 of the side plate 39, and the second rod 72 is shown to be fixedly mounted with respect to that side plate 39, it is to be understood that this form of the invention including the slats and stub shafts would also work effectively if the first rod 70 was fixedly mounted with respect to the leading end portion 32 of the side plate 39 and the second rod 72 was mounted through the side plate 39 to pivot with respect to that side plate.

Although the present invention has been described with reference to preferred embodiments, workers skilled in the art will recognize that changes may be made in form and detail without departing from the spirit and scope of the invention.

What is claimed is:

1. A roll-up cooking grill presenting, when in open condition for use, a relatively flat, substantially rectangular, longitudinally extending, upwardly facing cooking table; and when in rolled up condition for cleaning or storage, configured to be circumscribed within a generally cylindrical surface, said grill including:
    a. a plurality of mutually parallel, spaced-apart transversely extending rods;
    b. two sets of side plates, each set including a multiplicity of longitudinally extending side plates, each side plate having:
        (1) a leading end portion permanently mounted with respect to an outer end of a first of said rods,
        (2) an intermediate portion permanently mounted with respect to an immediately adjacent second rod in trailing direction, and
        (3) a trailing end portion extending into interfering relation above a third rod immediately adjacent the second rod in trailing direction;
    c. wherein each end of each rod is permanently mounted to two adjacent side plates;
    d. wherein at least one of the first and second rods is rotatably mounted with respect to each side plate; and
    e. wherein the upper edge surfaces of the rods define a relatively flat surface of a cooking table when the cooking grill is in open condition with the trailing end portion of each side plate supported on the upper edge of its third trailing rod.

2. The cooking grill of claim 1 having a predetermined longitudinal dimension measured from the leading ends of the first pair of side plates to the trailing ends of the last past of side plates, wherein:
    f. the diameter of a cylindrical surface which will circumscribe the grill in its rolled up condition is not greater than one third of said predetermined longitudinal dimension.

3. The cooking grill of claim 1 wherein:
    f. each corner portion of the grill cooking table is supported by a separate, elongate, downwardly extending leg when the grill is in its open condition.

4. The grill of claim 3 wherein:
    g. each leg is mounted to the cooking table to be foldable between a downwardly extending open condition and a rolled up condition in which its elongate axis is in substantially parallel alignment of the axes of the transversely extending rods.

5. The cooking grill of claim 4 wherein:
    h. each leg is generally L-shape in transverse cross-section, is pivotally mounted at its upper end portion with respect to its corner of the grill cooking table on an axis normal to the axes of the rods, and convergingly tapers from a point adjacent said pivot axis to an outer end of the leg.

6. The cooking grill of claim 5 wherein:
    i. each leg, when the grill is in open condition, extends slightly divergingly outwards from under its corner of the table.

7. The cooking grill of claim 6 wherein:

j. each leg lies in a vertical plane which extends at substantially at 45° angle with respect to the transverse axis of the rods and at an 45° angle with respect to the longitudinal axis of the side plates and diagonally outwardly from its corner of the table.

8. A roll-up portable table assembly presenting, when in open condition for use, a relatively flat, substantially rectangular, longitudinally extending, upwardly facing table; and, when in rolled up condition for storage, is configured to be circumscribed within a generally cylindrical surface; said table assembly including:
 a. plurality of mutually parallel, spaced apart, transversely extending rods;
 b. two sets of side plates, each set including a multiplicity of longitudinally extending side plates, each side plate having: (1) a leading end portion permanently mounted with respect to an outer end of a first of said rods, (2) an intermediate portion permanently mounted with respect to an immediately adjacent second rod in trailing direction, and (3) a trailing end portion extending into interfering relation above a third rod immediately adjacent the second rod in trailing direction;
 c. wherein each end of each rod is permanently mounted to two adjacent side plates;
 d. wherein at least one of the first and second rods of each side plate is rotatably mounted with respect to it; and
 e. wherein the upper edge surfaces of the rods define a relatively flat surface of a table when the table assembly is in an open condition with the trailing end portion of each side plate supported on the upper edge of its third rod.

9. The portable table assembly of claim 8 wherein:
 f. the second rod which is permanently mounted to the intermediate portion of each side plate is fixedly mounted to it; and
 g. the first rod which is permanently mounted to the leading end portion of each side plate is rotatably mounted with respect to it.

10. The portable table assembly of claim 9 wherein:
 h. each of the transverse rods includes an elongate, relatively flat slat with a pair of mutually concentrically positioned stub shafts extending outwardly from each end and extending into contact with the side plates; and
 i. each rod is fixedly mounted to the intermediate portion of its side plate in position such that the upper surfaces of the slats define said flat surface of said table when the table assembly is in open position.

11. The portable table assembly of claim 8 wherein:
 f. the first rod which is permanently mounted to the leading end portion of each side plate is fixedly mounted to it; and
 g. the second rod which is permanently mounted to the intermediate portion of each side plate is rotatably mounted with respect to it.

12. The portable table assembly of claim 11 wherein:
 h. each of the transverse rods includes an elongate, relatively flat slat with a pair of mutually concentrically positioned stub shafts extending outwardly from each end and into contact with the side plates; and
 i. each rod is fixedly mounted to the lead end portion of its side plate in position such that the upper surfaces of the slats define said flat surface of said table when the table assembly is in open condition.

13. The portable table assembly of claim 8 having a predetermined longitudinal dimension measured from the leading ends of the first pair of side plates to the trailing ends of the last pair of side plates, wherein:
 f. the diameter of a cylindrical surface which will circumscribe the portable table in its rolled up condition is not greater than one-third of predetermined longitudinal dimension.

14. The portable table assembly of claim 8 wherein:
 f. every side plate extends rearwardly and diagonally inwardly from its leading end portion where it is mounted with respect to its first rod, past its intermediate portion where it is mounted with respect to its trailing second rod, and to its trailing end portion which is in interfering relation to its trailing third rod; and
 g. all of the side plates of each set are related to each other such that each can move between its open condition and its rolled up condition without coming into interfering relation with either of its immediately adjacent leading and trailing side plates.

15. The portable table assembly of claim 8 wherein:
 f. the longitudinally leading corner portions of the table and the longitudinally trailing portions of the table are each supported from below by support leg means when the table assembly is in its open condition.

16. The portable table assembly of claim 15 wherein:
 g. each corner portion of the table is supported by a separate, elongate, downwardly extending leg when the table assembly is in open condition; and
 h. each leg is mounted to the table to be foldable between a downwardly extending open condition and a rolled up condition in which its elongate axis is in substantially parallel alignment to the axes of the transversely extending rods.

17. A cooking grill cooking, cleaning and storage kit including:
 a. a roll up cooking grill assembly presenting:
  (1) when in open condition for use, a relatively flat, substantially rectangular, upwardly facing cooking table having a first predetermined longitudinal dimension and a second predetermined transverse dimension, and
  (2) when in rolled up condition for cleaning or for storage, is configured to be circumscribed within a generally cylindrical surface;
 (b) said grill including:
  (1) a plurality of mutually parallel, spaced-apart, transversely extending rods,
  (2) two sets of side plates, each set including a multiplicity of longitudinally extending side plates, each side plate having a:
   (a) a leading end portion permanently mounted with respect to an outer end of one of said rods,
   (b) an intermediate portion permanently mounted with respect to it an immediately adjacent second rod in trailing direction, and
   (c) a trailing end portion extending into interfering relation above a third rod immediately adjacent the second rod in trailing direction,
  (3) wherein each end of each rod is permanently mounted to two adjacent side plates, (4) wherein at least one of its first and second rods is rotatably mounted with respect to each side plate, and (5) wherein the upper edge surfaces of the rod define a relatively flat surface of a cooking table wherein the grill is in an open condition with the trailing end portion of each side plate supported on the upper edge of its third rod;

c. a liquid-tight, right circular cylindrical case closed at one end, and of configuration to completely encompass the grill assembly when in its rolled up condition, the case having an internal diameter no less than one-third and no more than one-half of said first predetermined longitudinal dimension of the open cooking table, and having an internal longitudinal dimension no less than the second predetermined transverse dimension of the open cooking table; and d. removable cover means adapted to form a liquid-tight seal with the case when the rolled up grill and cleaning liquid are in the case, and to form a moisture-tight seal in the case when the case is dry and the rolled up grill is dry and inside of the case.

18. The cooking grill cooking, cleaning and storage kit of claim 17 wherein:

e. the internal diameter of the case is approximately one-third of the first predetermined longitudinal dimension of the open cooking table and the internal longitudinal dimension of the cavity in the case with the cover means in place is only slightly greater than the second predetermined greatest transverse dimension of the open grill table.

* * * * *